(12) United States Patent
Calvo et al.

(10) Patent No.: US 8,074,685 B2
(45) Date of Patent: Dec. 13, 2011

(54) ONE-WAY VALVE WITH FLAPPER FOR VACUUM BAG

(75) Inventors: Martin Calvo, Chula Vista, CA (US); Linh Pham, Chula Vista, CA (US); Michael Burton, Chula Vista, CA (US)

(73) Assignee: Illinois Tool Works, Inc., Glenview, IL (US)

( * ) Notice: Subject to any disclaimer, the term of this patent is extended or adjusted under 35 U.S.C. 154(b) by 334 days.

(21) Appl. No.: 12/417,799

(22) Filed: Apr. 3, 2009

(65) Prior Publication Data

US 2009/0257688 A1    Oct. 15, 2009

Related U.S. Application Data

(60) Provisional application No. 61/044,539, filed on Apr. 14, 2008.

(51) Int. Cl.
*F16K 15/16* (2006.01)

(52) U.S. Cl. ........... 137/855; 206/524.8; 383/103; 141/65; 251/82

(58) Field of Classification Search ............ 137/855, 137/854, 512.15, 223; 206/524.8; 383/43, 383/100, 103; 141/65; 251/82
See application file for complete search history.

(56) References Cited

U.S. PATENT DOCUMENTS

| 4,776,501 | A | 10/1988 | Ostrowsky |
| 5,332,095 | A | 7/1994 | Wu |
| 5,954,196 | A | 9/1999 | Lin |
| 2004/0232368 | A1 | 11/2004 | Motonaka et al. |
| 2005/0211319 | A1 | 9/2005 | Kobetsky |
| 2007/0068841 | A1 | 3/2007 | Tanaka |
| 2007/0095403 | A1 | 5/2007 | Su |
| 2007/0241023 | A1 | 10/2007 | Ootsubo et al. |
| 2009/0050512 | A1* | 2/2009 | Pham ............ 206/524.8 |

FOREIGN PATENT DOCUMENTS

WO    WO 2007/037081 A1    5/2007

\* cited by examiner

*Primary Examiner* — John Rivell
*Assistant Examiner* — Macade Brown
(74) *Attorney, Agent, or Firm* — Ostrager Chong Flaherty & Broitman P.C.

(57) ABSTRACT

A one-way valve allows air to be drawn from a collapsible, flexible, airtight bag using a vacuum source. When the vacuum source is removed, the one-way valve prevents air from re-entering the bag. The valve assembly comprises a valve base attached to a bag wall and having an opening, a cap base coupled to the valve base, a flapper held in place by the valve base and cap base, and a cap connected to the cap base by a living hinge. When the cap is snapped onto the cap base after bag evacuation, the cap maintains the flapper in a position so that the opening in the valve base stays closed, preventing the admission of ambient air into the evacuated bag.

20 Claims, 7 Drawing Sheets

ONE-WAY VALVE WITH FLAPPER FOR VACUUM BAG

RELATED PATENT APPLICATION

This application claims the benefit, under Title 35, United States Code, §119(e), of U.S. Provisional Application No. 61/044,539 filed on Apr. 14, 2008.

BACKGROUND

This invention generally relates to evacuable storage containers, and in particular, to evacuable reclosable storage bags.

Collapsible, evacuable storage containers typically include a flexible, airtight bag, an opening through which an article is inserted inside the bag, and a fixture through which excess air is evacuated. A user places an article into the bag through the opening, seals the opening, and then evacuates the air in the bag through the fixture. With the bag thus evacuated, a compressible article contained therein may be significantly compressed so that it is easier to transport and requires substantially less storage space.

Collapsible, evacuable storage containers are beneficial for reasons in addition to those associated with compression of the stored article. For example, removal of the air from the storage container inhibits the growth of destructive organisms, such as moths, silverfish, and bacteria, which require oxygen to survive and propagate. Moreover, such containers, being impervious to moisture, inhibit the growth of mildew.

Not only large, compressible items such as clothing may be stored in a collapsible, evacuable storage container. For example, it may be desirable to store bulk items made of small particles, such as powders or granulated resins, in an evacuated container. One situation that commonly occurs is that a particular bulk item is shipped in a large, rigid container such as a drum. Bulk items may be moisture sensitive and are sealed against moisture during shipment. But many times a user does not need to use the entire contents of the large container, and so once exposed to the moisture in the air the remaining bulk contents quickly become unusable and are thus wasted.

One collapsible, reusable, evacuable storage container is shown in U.S. Pat. No. 5,480,030. This patent discloses a one-way air valve assembly having a flexible diaphragm that seals against a valve seat. The valve assembly also has vanes positioned to prevent the bag material or bag contents from obstructing air holes or the diaphragm while air is being evacuated through the valve assembly.

There is a continuing need for improvements in the valve assembly of such evacuable storage containers.

BRIEF SUMMARY

The invention is directed to improvements in valve assemblies for use in collapsible, evacuable storage containers. Such storage containers have a one-way valve assembly that allows air to be drawn from a collapsible, flexible, airtight bag using a vacuum source. When the vacuum source is removed, the one-way valve prevents air from re-entering the bag.

In the embodiments disclosed hereinafter, the valve assembly comprises a valve base having an opening, a cap base coupled to the valve base, a flapper (i.e., diaphragm) having a portion held in place by the valve base and cap base, and a cap connected to the cap base by a living hinge. The valve base is permanently attached to one wall of a reclosable storage bag by heat sealing. There are rounded posts at the bottom of the valve base to allow sufficient airflow paths between opposing walls of the bag; these rounded structures also minimize the risk of a bag wall being perforated by the ribs. The valve can be opened for air evacuation by opening the cap. The living hinge prevents the cap from being separated from the cap base; the cap base is press-fit onto the valve base such that it cannot be removed easily (to reduce the risk of losing the cap). The valve base has an opening, through which air can be forced out (e.g., by applying external pressure on the bag in which a compressible article has been placed) or sucked out (using a device such as a common household vacuum cleaner). In the closed position, the cap presses on a main portion of the flapper, thus creating an airtight seal as the flapper bears against rims on the valve base; when the cap is opened, the main portion of the flapper will be free to lift open to allow for air evacuation.

One aspect of the invention is a valve assembly comprising: a valve base having an air escape opening, the valve base comprising a seat that surrounds the air escape opening; a cap base coupled to the valve base, the cap base having an opening that at least partly overlies the air escape opening of the valve base; a flapper having a first portion held in place by the valve base and the cap base and a second portion that is not held in place by the valve base and the cap base; and a cap capable of being press-fit onto the cap base, the cap comprising a first portion that contacts a portion of the cap base when the cap is press-fit onto the cap base, a second portion that covers the air escape opening of the valve base when the cap is press-fit onto the cap base, and a third portion that maintains the second portion of the flapper in airtight sealing contact with the seat of the valve base along an entire perimeter of the seat when the cap is press-fit onto the cap base, wherein when the cap is not press-fit on the cap base, the second portion of the flapper is free to adopt a configuration whereby the second portion of the flapper is not in airtight sealing contact with the seat.

A further aspect of the invention is a valve kit comprising: a valve base having an opening, the valve base comprising a seat that surrounds the opening; a part comprising a cap base, a cap and a living hinge that connects the cap to the cap base, the cap base having an opening; and a flapper comprising first and second portions, wherein the cap base is capable of being coupled to the valve base, and the cap is capable of being press-fit onto the cap base, the kit being assembled by placing the first portion of the flapper between respective portions of the valve base and the cap base and then coupling the cap base to the valve base, wherein when the kit is assembled and the cap is press-fit onto the cap base, a first portion of the cap contacts a portion of the cap base, a second portion of the cap covers the opening of the cap base, and a third portion of the cap maintains the second portion of the flapper in airtight sealing contact with the seat of the valve base along an entire perimeter of the seat, and wherein when the kit is assembled and the cap is not press-fit on the cap base, the second portion of the flapper is not maintained in airtight sealing contact with the seat.

A further aspect of the invention is a bag comprising: a receptacle having a mouth at an upper end and comprising a first wall having an aperture and a second wall opposing the first wall; a resealable hermetic sealing device joined to the mouth; and a one-way valve assembly installed in the aperture in the wall of the receptacle and comprising: a valve base comprising an air escape opening, a seat disposed along a periphery of the air escape opening, and a flange surrounding the seat and joined to the wall of the receptacle; a cap base coupled to the valve base, the cap base having an opening that at least partly overlies the air escape opening of the valve base; a flapper having a first portion held in place by the valve base and the cap base and a second portion that is not held in place by the valve base and the cap base; and a cap capable of being press-fit onto the cap base, the cap comprising a first portion that contacts a portion of the cap base when the cap is press-fit onto the cap base, a second portion that covers the air escape opening of the valve base when the cap is press-fit onto the cap base, and a third portion that maintains the second portion of the flapper in hermetic sealing contact with the seat of the valve base along an entire perimeter of the seat when the cap is press-fit onto the cap base, wherein when the cap is not press-fit on the cap base, the second portion of the flapper is free to adopt a configuration whereby the second portion of the flapper is not in hermetic sealing contact with the seat of the valve base.

Other aspects of the invention are disclosed and claimed below.

BRIEF DESCRIPTION OF THE DRAWINGS

FIG. 2 shows only respective portions of the front and rear walls of the receptacle.

Reference will now be made to the drawings in which similar elements in different drawings bear the same reference numerals.

DETAILED DESCRIPTION

Figure 1:
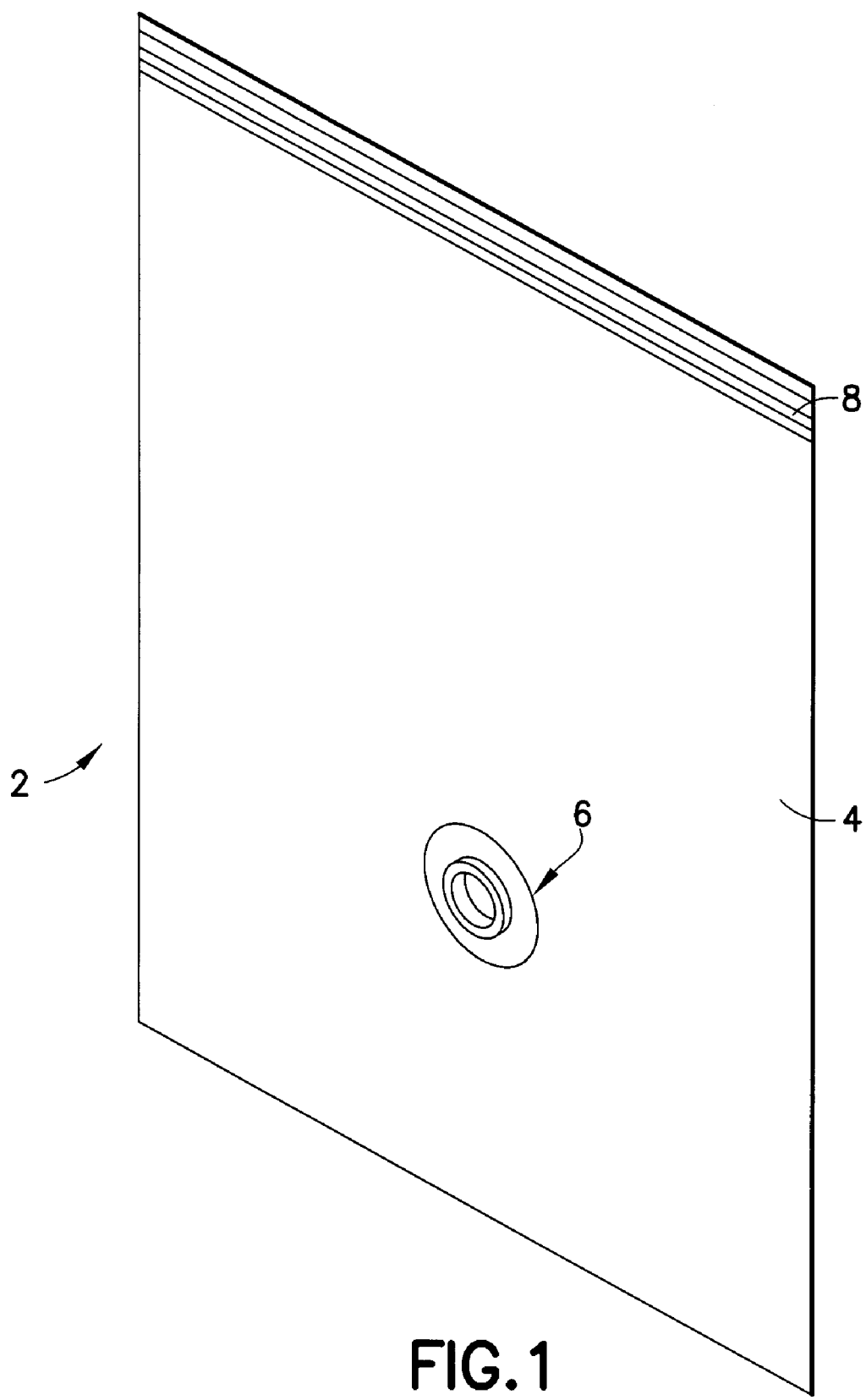
FIG. 1 is a drawing showing an isometric view of one conventional type of collapsible, evacuable storage bag.

FIG. 1 shows a conventional collapsible, evacuable storage container 2 comprising a bag 4, a valve assembly 6, and a zipper 8 comprising a pair of mutually interlockable extruded zipper strips that are joined to each other at opposing ends thereof. Although not shown in FIG. 1, the conventional valve assembly 6 also typically comprises a separate cap that can be snapped onto a portion of the valve assembly that is disposed on the exterior of the bag 4. The cap must be removed before the bag can be evacuated, and then is replaced after the bag has been evacuated. The cap is intended to supplement the air pressure on the diaphragm and help to seal the valve assembly to prevent air from entering the evacuated bag.

The bag 4 typically comprises front and rear walls or panels (made of thermoplastic material) that are joined together at the bottom and two sides by conduction heat sealing to form a receptacle having an interior volume and a mouth in which the zipper 8 is installed. One wall of bag 4 has a hole (not shown in FIG. 1) in which to install the valve assembly 6. The bag may be constructed of a blended extrusion layer of polyethylene sandwiched between a nylon layer and a layer of polyethylene sheeting. However, the materials comprising the bag may be altered so as to prevent interaction with the bag contents.

During use, one or more discrete articles or a bulk material (not shown) may be placed inside the bag 4 while the zipper 8 is open, i.e., while the closure profiles of the interlockable zipper strips are disengaged from each other. After the article or material to be stored has been placed inside the bag, the mouth of the bag 4 can be sealed by pressing the zipper strips together to cause their respective closure profiles to interlock with each other. Although the zipper closure profiles may have many different designs, the design must be one that ensures that an airtight seal can be formed at the mouth of the bag.

With the zipper 8 closed, the interior volume of the bag or receptacle 4 is sealed to be airtight. The interior volume can now be evacuated by sucking air out of the bag via the one-way valve assembly 6. Air can be drawn out of bag 4 through valve assembly 6 using a conventional vacuum source, such as a household or industrial vacuum cleaner. The valve assembly 6 and the zipper 8 maintain the vacuum inside bag 4 after the vacuum source is removed.

Valve assemblies in accordance with two exemplary embodiments of the present invention will now be described with reference to FIGS. 2-8 and FIGS. 9-14, respectively. Either of these valve assemblies can be substituted for the prior art valve assembly 6 in storage bags of the type depicted in FIG. 1.

In the embodiments disclosed hereinafter, the valve assembly comprises a valve base having an opening, a cap base coupled to the valve base, a flapper (i.e., diaphragm) having a portion held in place by the valve base and cap base, and a cap connected to the cap base by a living hinge. The valve base is permanently attached to one wall of a reclosable storage bag by heat sealing. There are rounded posts at the bottom of the valve base to allow sufficient airflow paths between opposing walls of the bag; the rounded structures also minimize the risk of the bag wall being perforated by the ribs. The valve can be opened for air evacuation by opening the cap. The cap cannot be separated from the cap base because it is connected to the latter by means of a living hinge. The cap base is press-fit onto the valve base such that it cannot be removed easily (to reduce the risk of losing the cap). The valve base has an opening, through which air can be forced out (e.g., by applying external pressure on the bag in which a compressible article has been placed) or sucked out (using a device such as a common household vacuum cleaner). In the closed position, the cap presses on a main portion of the flapper, thus creating an airtight seal as the flapper bears against rims on the valve base; when the cap is opened, the main portion of the flapper will be free to lift open to allow for air evacuation.

Once the pressure inside the bag is less than that of the outside atmospheric pressure, the "vacuum" inside the bag is maintained due to the atmospheric pressure exerted onto the flappers upper surface; the flapper forms an airtight seal with the base by interacting with a valve seat. Alternatively, the flapper may interact with two rims on the base surface, as taught in U.S. patent application Ser. No. 12/075,755. The cap has two ribs that bear against the main portion of the flapper and act as clamps to provide an airtight circumference once the cap is in the closed position. A portion of the flapper is trapped between the valve base and cap base by design to eliminate the risk of the flapper being extracted by a strong vacuuming force. Additional ribs at the bottom of the valve base extend across the escape vent hole to prevent the bag film from blocking the air escape route during evacuation.

Figure 2:
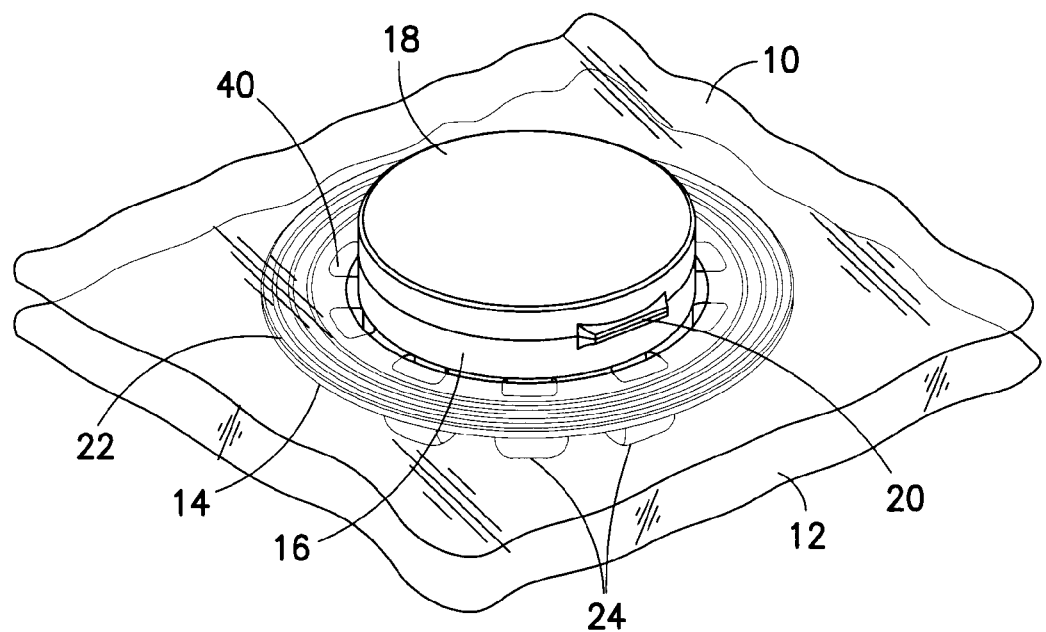
FIG. 2 is a drawing showing an isometric view, from above, of a valve assembly in accordance with a first embodiment of the present invention, which valve assembly is attached to a front wall of a receptacle.
Figure 3:
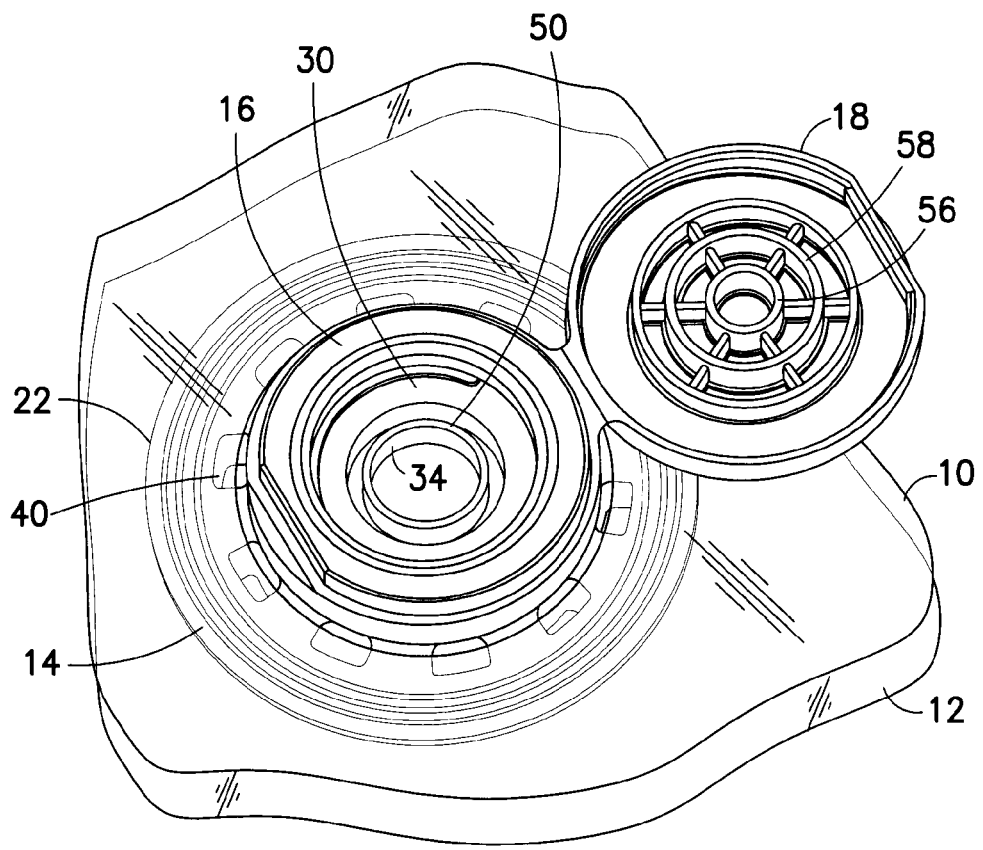
FIG. 3 is a drawing showing an isometric view, from above, of the valve assembly and receptacle wall portions depicted in FIG. 2, but with a cap removed from a cap base to reveal a flapper element overlying a base opening.

FIGS. 2 and 3 are isometric views, from above, showing a valve assembly, in closed and open states respectively, in accordance with one embodiment. The valve assembly is installed in an opening formed in one wall 10 of a reclosable storage bag. Each of FIGS. 2 and 3 only shows portions of two opposing walls 10 and 12 of the storage bag, which may be similar in construction to the bag depicted in FIG. 1. The walls 10 and 12 may be joined at two (mutually parallel) side seals and along a bottom seal (perpendicular to the side seals), none of which seals are shown in the drawings, but which are well known in the art. Alternatively, the bag may be gusseted.

The valve assembly depicted in FIGS. 2 and 3 comprises a valve base 14, a cap base 16 coupled to the valve base 14, and a cap 18 that is connected to the cap base 16 by means of a living hinge 20 which allows the cap 18 to be pivoted relative to the cap base 16. The cap 18 can be press fit onto the cap base 16 for closing the valve, as seen in FIG. 2. When the valve is open, i.e., when cap 18 is in its open position as seen in FIG. 3, air can be sucked out of the storage bag using a device such as a common household vacuum cleaner. The valve base and the part consisting of the valve base, cap and living hinge are preferably made of injection-molded thermoplastic material.

Referring to FIG. 2, the valve base 14 comprises an annular flange 22 that is heat sealed to the interior surface of bag wall 10. Thus the flange 22 is located inside the bag, between the opposing walls 10 and 12 of the bag. A portion of the valve base (not shown in FIG. 2) projects through an opening in bag wall 10. The cap base 16 is disposed outside the storage bag and is coupled to that portion of the valve base that projects through the aforementioned opening in the bag wall.

Figure 4:
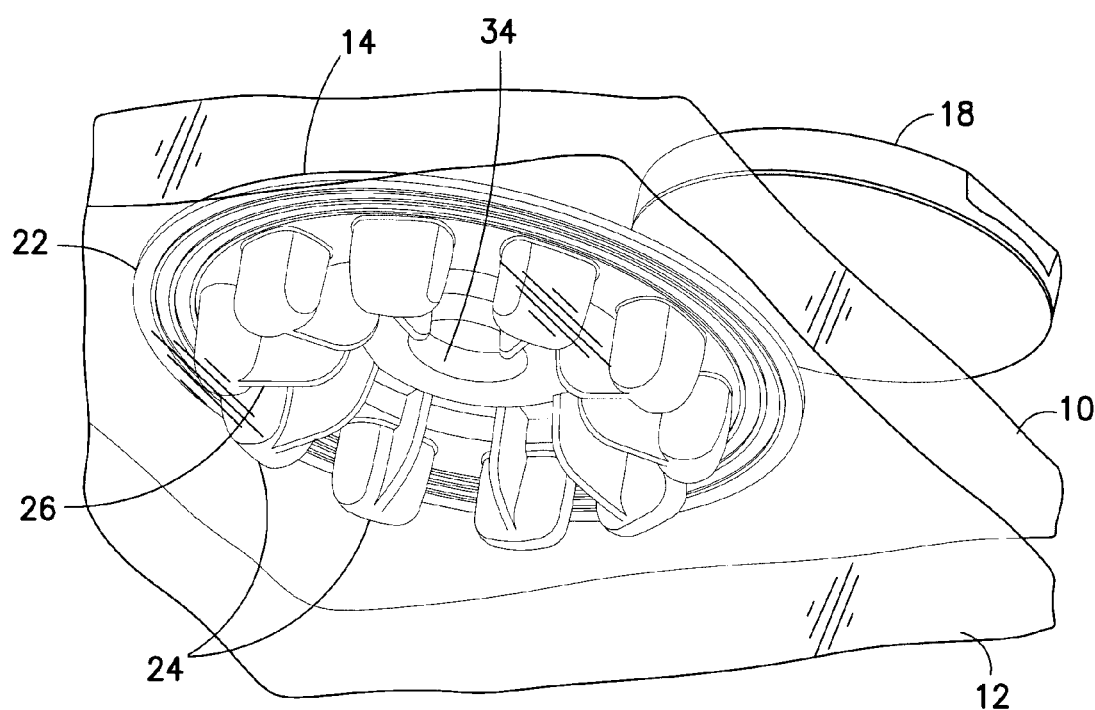
FIG. 4 is a drawing showing an isometric view, from below, of the valve assembly and receptacle wall portions depicted in FIG. 3.

Referring now to FIG. 4, the valve base 14 comprises a plurality of rounded posts 24 that project from the bottom surface of flange 22. In this particular embodiment, the posts 24 are hollow, as indicated by cavities 40, seen in FIGS. 2 and 3. However, the posts could be solid, not hollow. In addition, the valve base 14 comprises a plurality of vanes 26, a respective vane 26 projecting radially inward from each rounded post 24. The posts 24 and vanes 26 make it impossible for the opposing portion of bag wall 12 or any portion of an article contained in the bag to be sucked into a position where the opening 34 in the valve base 14 would become closed during evacuation.

Returning to FIG. 3, the valve assembly further comprises a flapper 30 which is shown in a position overlying opening 34 and in contact with a circular seat 50 formed as part of the valve base 14. The valve seat 50 encircles the circular opening 34. In this exemplary embodiment, the flapper 30 is made of clear polyvinylchloride (PVC), which explains why opening 34 and seat 50 are visible in FIG. 3 even though covered by the flapper 30.

Figure 5:
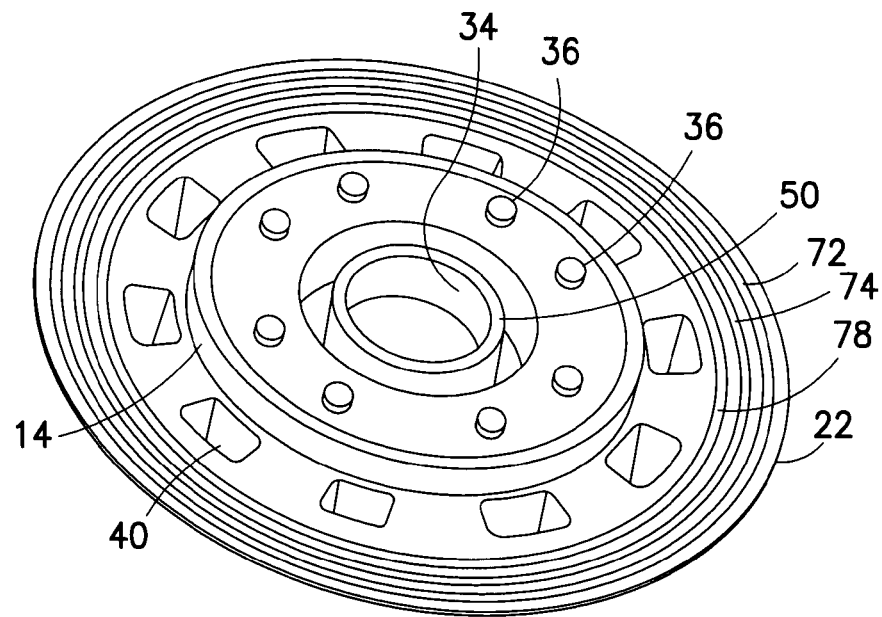
FIG. 5 is a drawing showing an isometric view, from above, of a valve base in accordance with the first embodiment.
Figure 6:
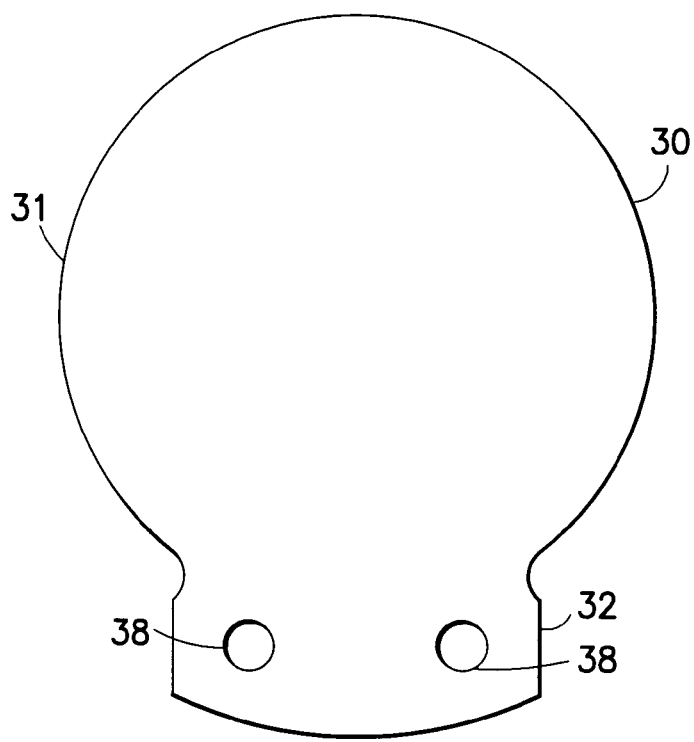
FIG. 6 is a drawing showing a top plan view of a flapper element in accordance with the first embodiment.

FIG. 6 shows a top plan view of a flapper element in accordance with the first embodiment depicted in FIG. 3. The flapper 30 comprises a generally circular main portion 31 and a base portion 32 having a pair of small circular holes 38. The main portion 31 is freely movable when the cap is removed from the cap base, as indicated by dashed lines in FIG. 7. The base portion 32 is held in place by respective portions of the valve base and cap base, as will now be explained with reference to FIGS. 5 and 7.

Figure 7:
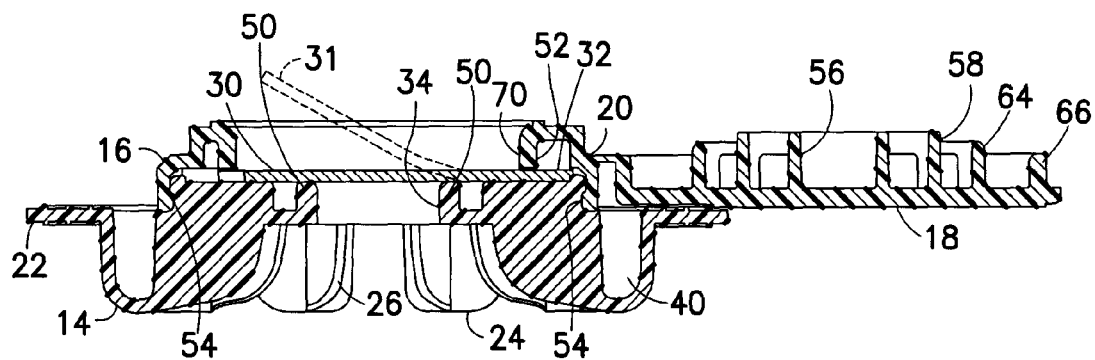
FIG. 7 is a drawing showing a cross-sectional view of the valve assembly depicted in FIG. 3, i.e., with the cap in its open position.

Referring to FIG. 5, the valve base 14 is provided with a plurality of pairs of standoffs 36. During valve assembly, the flapper 30 shown in FIG. 6 can be placed on top of the valve base shown in FIG. 5 and positioned so that the holes 38 in flapper 30 fit over a pair of standoffs 36 with the main portion 31 of flapper 30 overlying opening 34 and in contact with seat 50. Then the cap base can be coupled to the valve base as shown in FIG. 7. More specifically, the cap base has an annular projection 54 on its inner periphery which fits in a corresponding annular recess formed on the outer periphery of the portion of valve base 14 that projects though the opening in the bag wall (previously described). When the valve base and cap base are fully coupled, a portion of an annular rim 52 formed as part of the cap base 16 prevents the base portion 32 of flapper 30 from lifting off of the aforementioned valve base standoffs, thereby preventing the flapper from being sucked into the vacuum source as the main portion 31 is lifted off of valve base seat 50, as depicted by dashed lines in FIG. 7.

The flapper 30 provides the one-way airflow feature in the valve assembly. When the cap 18 is in the position shown in FIG. 7, the flapper 30 is free to lift off of the valve seat 50, thereby uncovering an opening 70 in the cap base 16 as well as the underlying opening 34 in the valve base. This cap position allows air to be extracted from the bag. A vacuum source (not shown) can be placed with the terminus of its nozzle pressed against the cap base 16 to draw air through the valve. The suction applied by the vacuum nozzle causes the main portion 31 of the flapper 32 to flex upward, as indicated by dashed lines in FIG. 7.

Figure 8:
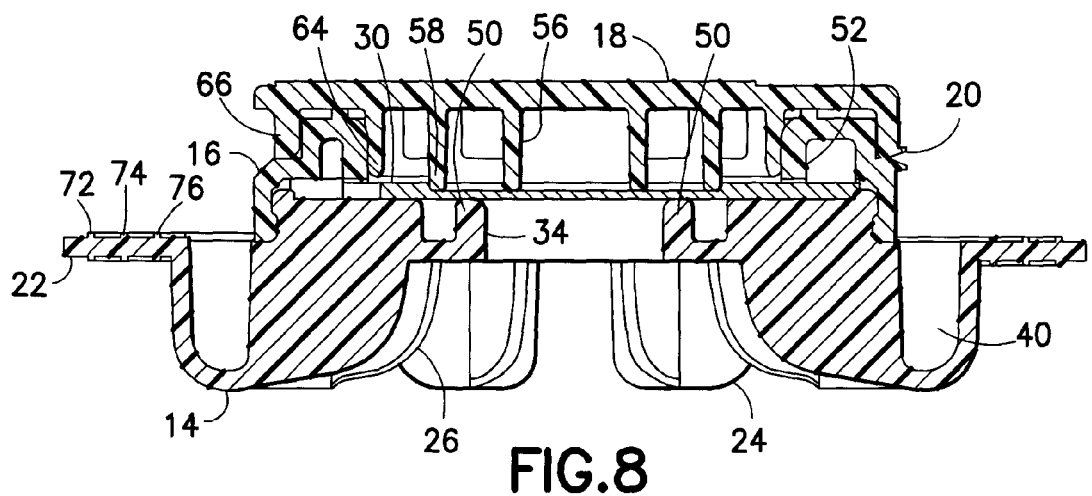
FIG. 8 is a drawing showing a cross-sectional view of the valve assembly depicted in FIG. 3, i.e., with the cap in its closed position.

When the vacuum source nozzle is removed, flapper 30 returns to its original shape and bears against the valve seat 50. Once the pressure inside the bag is less than that of the outside atmospheric pressure, the "vacuum" inside the bag is maintained due to the atmospheric pressure applied onto the flapper's upper surface. The valve can then be securely closed by pressing cap 18 onto cap base 16 as shown in FIG. 8.

After air inside the bag has been removed by the vacuum source (or by the application of external pressure on the bag when loaded with a compressible article), the main portion of the flapper returns to the position wherein the main portion 31 contacts the seat 50 and covers the opening 24 in the valve base 14, as shown in FIG. 7. The flapper is held in contact with seat 50 due to the fact that the pressure inside the bag is now less than the pressure of the ambient atmosphere. In this state, the cap 18 can now be placed over and press fit onto the cap base 16, as shown in FIG. 8. The cap is held on the cap base by friction at the interfaces where rims 64 and 66 of cap 18 contact opposing inner and outer peripheral surfaces of the cap base 16, as seen in FIG. 8. In the valve closed position, the main portion of flapper 30 is held down by the rims of a pair of concentric downwardly depending walls 56 and 58 integrally formed on the cap 18. More specifically, walls 56, 58 have heights designed so that their rims press the flapper against the valve seat 50, thus creating an airtight seal that prevents air from flowing in a reverse direction through the opening 34 in valve base 14. Wall 58 has a diameter greater than the diameter of seat 50, while wall 56 has a diameter less than the diameter of seat 50.

As previously discussed, the valve assembly is mounted to a wall of a storage bag such that flange 22 of valve base 14 is on the inside of the bag. The valve base 14 is held in place by welding the base flange 22 to the material of the bag wall to provide a seal. In a preferred embodiment, the valve base 14 is permanently attached to the bag wall by heat sealing. The heat seal makes a complete circle around the circumference of the hole in the bag wall through which a portion of the valve base 14 projects, thereby blocking the passage of air between the bag wall and the base flange 22 and then out the hole in the bag wall.

Optionally, means are provided on the flange 22 of valve base 14 for improving the speed of the conduction heat sealing operation by which the valve assembly is attached to the bag. As best seen in FIG. 8, the foregoing means comprise a series of concentric circular beads formed on the upper surface of the flange 22 to which the bag wall is joined. In the example shown in FIG. 8, three circular beads 72, 74, 76 are provided. During the sealing operation (sealing the base of the valve assembly to the bag making film), a portion of the bag making film on the periphery of the hole through which the valve base 14 passes is pressed between a heated annular sealing ring (not shown) and the flange 22. Portions of one or more of the beads are melted along the entire circumference of the sealing ring during the heat sealing operation, thereby providing an annular airtight seal around the hole in the bag. The beads act as heat concentrators during the sealing operation. The beads melt rapidly and then fuse to the bag making film to form the airtight seal during cooling. The presence of these heat-concentrating beads speeds up the conduction heat sealing process, thereby reducing the cost of manufacture.

Figure 9:
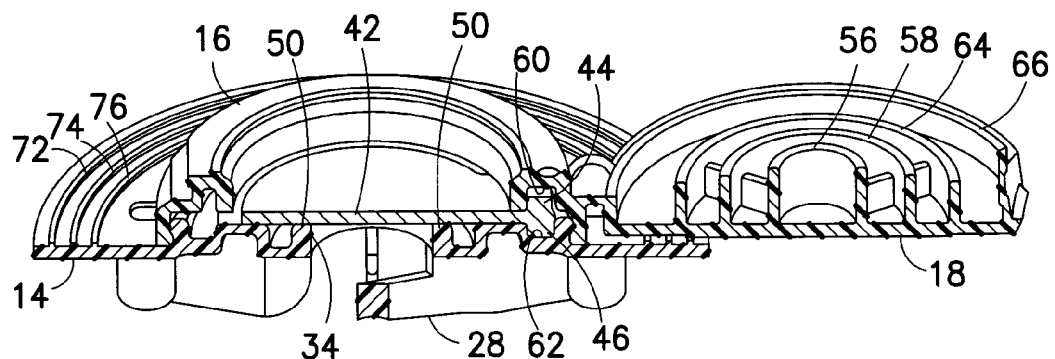
FIG. 9 is a drawing showing a cross-sectional view of a valve assembly in accordance with a second embodiment of the invention.
Figure 10:
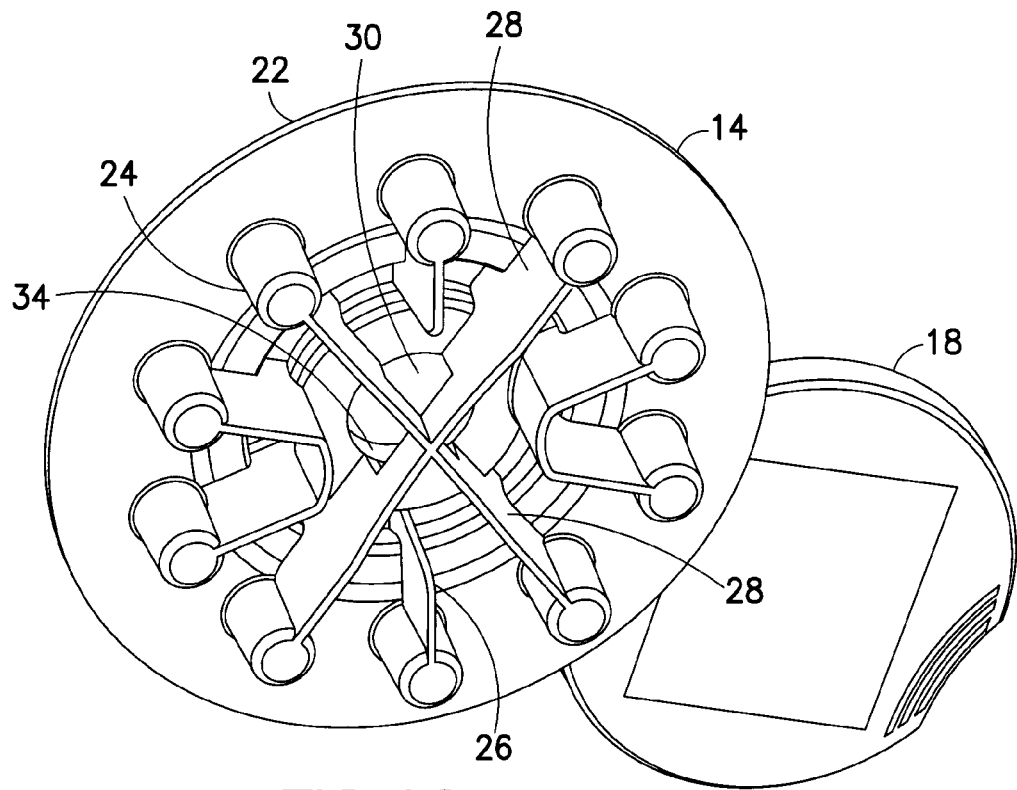
FIG. 10 is a drawing showing an isometric view, from below, of the valve assembly partly depicted in FIG. 9.
Figure 11:
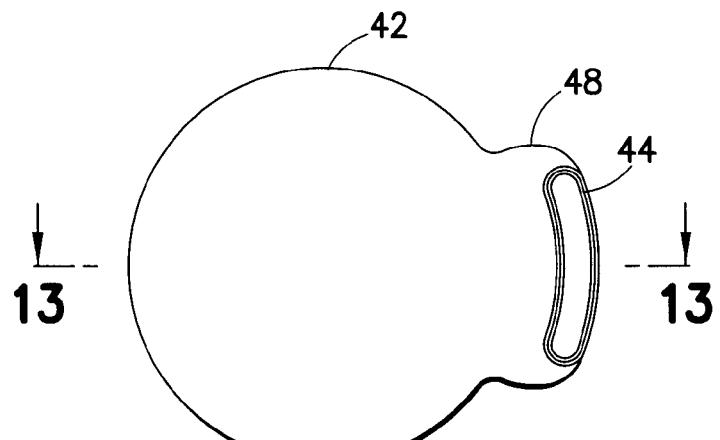
FIG. 11 is a drawing showing a top plan view of a flapper element in accordance with the second embodiment.
Figure 12:
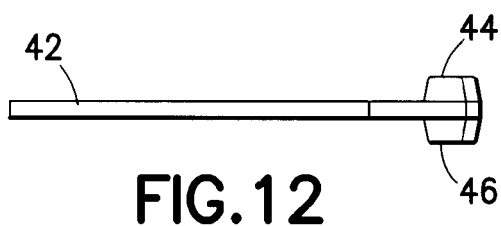
FIG. 12 is a drawing showing a side view of the flapper element depicted in FIG. 11.
Figure 13:
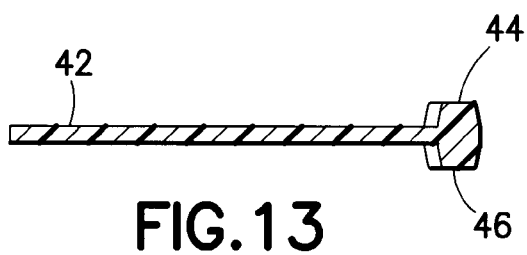
FIG. 13 is a drawing showing a sectional view of the flapper element depicted in FIG. 11, the section being taken along line 13-13 indicated in FIG. 11.
Figure 14:
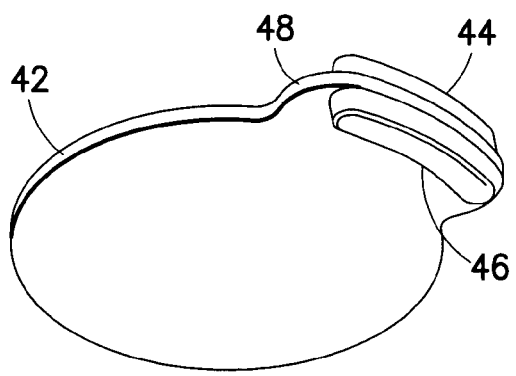
FIG. 14 is a drawing showing an isometric view of the flapper element depicted in FIG. 11.

An additional exemplary embodiment of the valve assembly is shown in FIGS. 9 and 10. This embodiment differs from the embodiment already described in two basic respects: (1) a T-shaped feature on the flapper is latched in opposing grooves respectively formed in the valve base and the cap base to prevent the flapper from being sucked into a vacuum cleaner hose; and (2) additional ribs under the valve base extend across the opening in the valve base to prevent the bag film from blocking the air escape route during vacuuming. FIG. 9 shows a flapper 42 having such a T-shaped feature consisting of an upward projection 44 which is received in a groove 60 formed in the cap base 16 and a downward projection 46 which is received in a groove 62 formed in the valve base 14. Four views of this flapper with T-shaped feature are presented in FIGS. 11-14. FIG. 10 shows an X-shaped structure which essentially consists of a pair of ribs 28 that each extend from one rounded post 24, across the opening 34, to a diametrically opposed rounded post 24. The portions of ribs 28 that underlie opening 34 in the valve base 14 prevent the bag film from closing that opening.

The evacuable storage bag may be constructed from two panels (items 10 and 12 in FIGS. 2-4) of film joined together (e.g., by conduction heat sealing) along three sides of a rectangle (not shown). To maintain a vacuum inside the storage bag, the bag's zipper in a closed state must provide an airtight seal at the mouth (i.e., fourth side) of the bag. Many different types of zippers can be used. The present invention is not directed to any particular zipper construction. For the sake of illustration, however, a suitable zipper for use with the present invention is described in U.S. Published Patent Application Publ. No. 2005/0211319 (see FIG. 13 therein and associated description), the contents of which are fully incorporated by reference herein.

The person skilled in the art of manufacturing reclosable bags on a machine would readily appreciate that instead of forming the bag from two separate webs of plastic film joined together on three sides, the bag can be formed from a single web of film that has been folded. In the completed bag, this fold will form the bottom of the bag, while the two side seals are formed by conduction heat sealing.

While the invention has been described with reference to preferred embodiments, it will be understood by those skilled in the art that various changes may be made and equivalents may be substituted for members thereof without departing from the scope of the invention. In addition, many modifications may be made to adapt a particular situation to the teachings of the invention without departing from the essential scope thereof. Therefore it is intended that the invention not be limited to the particular embodiment disclosed as the best mode contemplated for carrying out this invention, but that the invention will include all embodiments falling within the scope of the appended claims.

As used in the claims, the verb "joined" means fused, bonded, sealed, tacked, adhered, etc., whether by application of heat and/or pressure, application of ultrasonic energy, application of a layer of adhesive material or bonding agent, interposition of an adhesive or bonding strip, etc.

The invention claimed is:

1. A valve assembly comprising:
   a valve base having an air escape opening, said valve base comprising a seat that surrounds said air escape opening;
   a cap base coupled to said valve base, said cap base having an opening that at least partly overlies said air escape opening of said valve base;
   a flapper having a first portion held in place by said valve base and said cap base and a second portion that is not held in place by said valve base and said cap base; and
   a cap capable of being press-fit onto said cap base, said cap comprising a first portion that contacts a portion of said cap base when said cap is press-fit onto said cap base, a second portion that covers said air escape opening of said valve base when said cap is press-fit onto said cap base, and a third portion that maintains said second portion of said flapper in airtight sealing contact with said seat of said valve base along an entire perimeter of said seat when said cap is press-fit onto said cap base,
   wherein when said cap is not press-fit on said cap base, said second portion of said flapper is free to adopt a configuration whereby said second portion of said flapper is not in airtight sealing contact with said seat.

2. The valve assembly as recited in claim 1, further comprising a living hinge that connects said cap to said cap base.

3. The valve assembly as recited in claim 1, wherein said valve base comprises first and second standoffs, and said first portion of said flapper comprises first and second holes, said first standoff projecting through said first hole in said flapper and said second standoff projecting through said second hole in said flapper.

4. The valve assembly as recited in claim 1, wherein said valve base comprises a first recess, said cap base comprises a second recess and said first portion of said flapper comprises first and second projections, said first projection projecting into said first recess and said second projection projecting into said second recess.

5. The valve assembly as recited in claim 4, wherein said first and second projections are disposed on opposite sides of said first portion of said flapper.

6. The valve assembly as recited in claim 1, wherein said valve base comprises a plurality of rounded posts that project in a direction away from said cap base.

7. The valve assembly as recited in claim 1, wherein said valve base further comprises a rib that extends across a space that underlies at least a portion of said air escape opening in said valve base.

8. The valve assembly as recited in claim 1, wherein said third portion of said cap comprises first and second walls having rims that contact said second portion of said flapper when said cap is press-fit on said cap base.

9. The valve assembly as recited in claim 1, wherein said first portion of said flapper is made of flexible material.

10. The valve assembly as recited in claim 1, wherein said valve base comprises an annular channel and said cap base comprises an annular bead that projects into said annular channel of said valve base.

11. A valve kit comprising:
- a valve base having an opening, said valve base comprising a seat that surrounds said opening;
- a part comprising a cap base, a cap and a living hinge that connects said cap to said cap base, said cap base having an opening; and
- a flapper comprising first and second portions,
- wherein said cap base is capable of being coupled to said valve base, and said cap is capable of being press-fit onto said cap base, said kit being assembled by placing said first portion of said flapper between respective portions of said valve base and said cap base and then coupling said cap base to said valve base,
- wherein when said kit is assembled and said cap is press-fit onto said cap base, a first portion of said cap contacts a portion of said cap base, a second portion of said cap covers said opening of said cap base, and a third portion of said cap maintains said second portion of said flapper in airtight sealing contact with said seat of said valve base along an entire perimeter of said seat, and
- wherein when said kit is assembled and said cap is not press-fit on said cap base, said second portion of said flapper is not maintained in airtight sealing contact with said seat.

12. The valve kit as recited in claim 11, wherein said valve base comprises first and second standoffs, and said first portion of said flapper comprises first and second holes, said first standoff projecting through said first hole in said flapper and said second standoff projecting through said second hole in said flapper when said kit is assembled.

13. The valve kit as recited in claim 11, wherein said valve base comprises a first recess, said cap base comprises a second recess and said first portion of said flapper comprises first and second projections, said first projection projecting into said first recess and said second projection projecting into said second recess when said kit is assembled.

14. The valve kit as recited in claim 11, wherein said valve base comprises a flange, a plurality of rounded posts that project on one side of said flange and a rib that extends across a space that underlies at least a portion of said air escape opening in said valve base.

15. The valve kit as recited in claim 11, wherein said valve base comprises an annular channel and said cap base comprises an annular bead that projects into said annular channel of said valve base when said kit is assembled.

16. A bag comprising:
- a receptacle having a mouth at an upper end and comprising a first wall having an aperture and a second wall opposing said first wall;
- a resealable airtight sealing device joined to said mouth; and
- a one-way valve assembly installed in said aperture in said wall of said receptacle and comprising:
- a valve base comprising an air escape opening, a seat disposed along a periphery of said air escape opening, and a flange surrounding said seat and joined to said wall of said receptacle;
- a cap base coupled to said valve base, said cap base having an opening that at least partly overlies said air escape opening of said valve base;
- a flapper having a first portion held in place by said valve base and said cap base and a second portion that is not held in place by said valve base and said cap base; and
- a cap capable of being press-fit onto said cap base, said cap comprising a first portion that contacts a portion of said cap base when said cap is press-fit onto said cap base, a second portion that covers said air escape opening of said valve base when said cap is press-fit onto said cap base, and a third portion that maintains said second portion of said flapper in airtight sealing contact with said seat of said valve base along an entire perimeter of said seat when said cap is press-fit onto said cap base,
- wherein when said cap is not press-fit on said cap base, said second portion of said flapper is free to adopt a configuration whereby said second portion of said flapper is not in airtight sealing contact with said seat of said valve base.

17. The bag as recited in claim 16, further comprising a living hinge that connects said cap to said cap base.

18. The bag as recited in claim 16, wherein said valve base comprises first and second standoffs, and said first portion of said flapper comprises first and second holes, said first standoff projecting through said first hole in said flapper and said second standoff projecting through said second hole in said flapper.

19. The bag as recited in claim 16, wherein said valve base comprises a first recess, said cap base comprises a second recess and said first portion of said flapper comprises first and second projections, said first projection projecting into said first recess and said second projection projecting into said second recess.

20. The bag as recited in claim 16, wherein said valve base comprises a plurality of rounded posts that project from said flange and a rib that extends across a space that underlies at least a portion of said air escape opening in said valve base.

* * * * *